United States Patent
Kazmi et al.

(10) Patent No.: US 11,096,102 B2
(45) Date of Patent: Aug. 17, 2021

(54) MEASUREMENTS CONSIDERING SS BLOCK CONFIGURATION

(71) Applicant: Telefonaktiebolaget LM Ericsson (publ), Stockholm (SE)

(72) Inventors: Muhammad Kazmi, Sundbyberg (SE); Christopher Callender, Kinross (GB); Icaro L. J. Da Silva, Solna (SE); Iana Siomina, Täby (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 1 day.

(21) Appl. No.: 16/623,155

(22) PCT Filed: Jun. 19, 2017

(86) PCT No.: PCT/SE2017/050664
§ 371 (c)(1),
(2) Date: Dec. 16, 2019

(87) PCT Pub. No.: WO2018/236256
PCT Pub. Date: Dec. 27, 2018

(65) Prior Publication Data
US 2021/0144601 A1    May 13, 2021

(51) Int. Cl.
*H04W 36/00* (2009.01)
*H04W 56/00* (2009.01)

(52) U.S. Cl.
CPC ... *H04W 36/0088* (2013.01); *H04W 36/0058* (2018.08); *H04W 56/001* (2013.01)

(58) Field of Classification Search
CPC ......... H04W 36/0088; H04W 36/0058; H04W 56/001

USPC .................. 370/331, 330, 336; 455/336, 423
See application file for complete search history.

(56) References Cited

U.S. PATENT DOCUMENTS

| 2016/0174224 A1* | 6/2016 | Tang ..................... H04L 1/1854 370/336 |
| 2018/0035435 A1* | 2/2018 | Gupta ................... H04L 5/0092 |
| 2018/0262998 A1* | 9/2018 | Park ................... H04W 72/1268 |
| 2019/0007943 A1* | 1/2019 | Takeda ............... H04W 72/0446 |
| 2019/0058538 A1* | 2/2019 | Sun ................... H04W 74/0891 |

(Continued)

FOREIGN PATENT DOCUMENTS

WO    2016181332 A1    11/2016

OTHER PUBLICATIONS

R2-1706730; Huawei et al: "Measurement configuration and procedures for SS and CSI-RS", 3GPP Draft; 3rd Generation Partnership Project (3GPP), Mobile Competence Centre ; 650, Route Des Lucioles ; F-06921 Sophia-Antipolis Cedex ; France, vol. RAN WG2, No. Qingdao, China; Jun. 17, 2017 (Jun. 17, 2017), XP051307099; consisting of 3 pages.

(Continued)

*Primary Examiner* — Danh C Le
(74) *Attorney, Agent, or Firm* — Christopher & Weisberg, P.A.

(57) ABSTRACT

There is disclosed a method of operating a user equipment in a radio access network. The method includes transmitting measurement reporting, the measurement reporting pertaining to a measurement time interval. The measurement time interval is determined based on a SS block configuration. The disclosure also pertains to related methods and devices.

17 Claims, 4 Drawing Sheets

(56) References Cited

U.S. PATENT DOCUMENTS

| | | | | |
|---|---|---|---|---|
| 2019/0135166 A1* | 5/2019 | Shibata | ................ | B60Q 1/0441 |
| 2019/0179004 A1* | 6/2019 | Okada | ................... | G01S 13/785 |
| 2019/0349977 A1* | 11/2019 | Hosseini | .......... | H04W 72/0446 |
| 2020/0100194 A1* | 3/2020 | Nangia | ................... | H04L 5/005 |
| 2020/0221402 A1* | 7/2020 | Zhang | ................ | H04W 74/006 |
| 2020/0351802 A1* | 11/2020 | Kim | ................... | H04W 56/001 |

OTHER PUBLICATIONS

R2-1706570; Mediatek Inc (Email Discussion Rapporteur); 3GPP Draft; 3rd Generation Partnership Project (3GPP), Mobile Competence Centre ; 650, Route Des Lucioles ; F-06921 Sophia-Antipolis Cedex ; France, vol. RAN WG2, No. Qingdao, China ;Jun. 16, 2017 (Jun. 16, 2017), KP051306503; consisting of 20 pages.

R2-1706977; VIVO: "Assistant information for idle measurement", 3GPP Draft; Assistance Information for Idle Measurement, 3rd Generation Partnership Project (3GPP), Mobile Competence Centre; 650, Route Des Lucioles ; F-06921 Sophia-Antipolis Cedex; Fran vol. RAN WG2, No. Qingdao, China; Jun. 17, 2017 (Jun. 17, 20177), XP051307233; consisting of 3 pages.

R4-1706840; Ericsson: "Further Analysis of Signal Quality Measurement for Mobility in NR", 3GPP Draft; Signal Quality Measurement in NR, 3rd Generation Partnership Project (3GPP), Mobile Competence Centre ; 650, Route Des Lucioles ; F-06921 Sophia-Antipolis Cedex; France, vol. RAN WG4, No. Qingdao, China;Jun. 19, 2017 (Jun. 19, 2017), XP051308595; consisting of 5 pages.

R1-1716156; Ericsson: "Mobility measurements on SS block and CSI-RS", 3GPP Draft; Mobility Measurements on SS Block and CSI-RS, 3rd Generation Partnership Project (3GPP), Mobile Competence Centre ; 650, Route Des Lucioles ; F-06921 Sophia-Antipolis Cedex; FR, vol. RAN WG1, No. Nagoya, Japan;Sep. 17, 2017 (Sep. 17, 2017) XP051339614; consisting of 10 pages.

International Search Report and Written Opinion of the International Searching Authority dated Jan. 26, 2018 issued in PCT Application No. PCT/SE2017/050664 , consisting of 14 pages.

* cited by examiner

MEASUREMENTS CONSIDERING SS BLOCK CONFIGURATION

CROSS-REFERENCE TO RELATED APPLICATIONS

This application is a Submission Under 35 U.S.C. § 371 for U.S. National Stage Patent Application of International Application Number: PCT/SE2017/050664, filed Jun. 19, 2017 entitled "MEASUREMENTS CONSIDERING SS BLOCK CONFIGURATION," the entirety of which is incorporated herein by reference.

TECHNICAL FIELD

The present disclosure pertains to wireless communication technology, in particular in the context of a radio access network (RAN) like one according to NR (New Radio, a 3GPP telecommunication standard).

BACKGROUND

Currently, new approaches for telecommunication are developed, in particular in the context of 5G ($5^{th}$ Generation) networks like NR. These new approaches bring new challenges in aspects. For example, measurement procedures need to be adapted to the new approaches. These procedures are important to facilitate efficient operation, in particular for mobility or handover related issues.

SUMMARY

It is an object of the present disclosure to provide approaches facilitating reliable measurement and measurement reporting when SS blocks are used.

The approaches are particularly advantageously implemented in a $5^{th}$ Generation (5G) telecommunication network or 5G radio access technology or network (RAT/RAN), in particular according to 3GPP ($3^{rd}$ Generation Partnership Project, a standardisation organization). A suitable RAN may in particular be a RAN according to NR, for example release 15 or later, or LTE Evolution.

Accordingly, there is disclosed a method of operating a user equipment (UE) in a radio access network. The method comprises transmitting measurement reporting, the measurement reporting pertaining to a measurement time interval and/or being based on a measurement configuration. The measurement time interval and/or measurement configuration is determined based on a SS block configuration.

Alternatively, or additionally, there is disclosed a method of operating a user equipment in a radio access network. The method may comprise performing measurements based on a measurement time interval and/or a measurement configuration as disclosed herein. The method may comprise performing an operation based on the measurements.

Moreover, a user equipment for a radio access network may be considered. The user equipment is adapted transmitting measurement reporting, the measurement reporting pertaining to a measurement time interval and/or being based on a measurement configuration, the measurement time interval and/or measurement configuration being determined based on a SS block configuration. The user equipment may comprise, and/or be adapted for utilising, processing circuitry and/or radio circuitry, in particular a transceiver and/or transmitter and/or receiver, for such transmitting, and/or for performing measurements. Alternatively, or additionally, the UE may comprise a transmitting module for such transmitting, and/or a measuring module for performing the measurements.

Alternatively, or additionally, there may be considered a user equipment for a radio access network being adapted for performing measurements based on a measurement time interval and/or a measurement configuration as disclosed herein. The UE further may be adapted for performing an operation based on the measurements. The user equipment may comprise, and/or be adapted for utilising, processing circuitry and/or radio circuitry, in particular a transceiver and/or transmitter and/or receiver, for performing the measurements, and/or the operation. Alternatively, or additionally, the UE may comprise a measuring module for performing the measurements, and/or an operating module for performing the operation.

The operation performed may in particular be measurement reporting, and/or performing a handover and/or determining and/or transmitting handover information, e.g. to a network or network node.

In addition, a method of operating a radio node in a radio access network is discussed. The method comprises configuring a user equipment with a measurement configuration, the measurement configuration indicating a measurement time interval, the measurement time interval being determined based on a SS block configuration.

A radio node in a radio access network may be considered. The radio node is adapted for configuring a user equipment with a measurement configuration. The measurement configuration indicates a measurement time interval, the measurement time interval being determined based on a SS block configuration. The radio node may comprise, and/or be adapted for utilising, processing circuitry and/or radio circuitry, in particular a transceiver and/or transmitter, for such configuring.

The term measurement time interval may correspond to a duration over the measurement or part of the measurement is performed by the UE.

The measurement time interval may comprise and/or overlap with at least one SS block in time. Alternatively, or additionally, the measurement time interval may be defined as one of the times indicated below, e.g. as Dm, and/or as $T_{RSSI}$, e.g. as indicated in table 2. The measurement time interval may start at a reference time, e.g. a reference symbol or symbol border. The start of a measurement time interval may be indicated or configured to the UE, e.g., in a measurement configuration, and/or may be predefined.

Generally, the measurement time interval may in particular comprise, and/or overlap, with a time interval between two SS blocks. The two SS blocks may belong to the same burst and/or set, or to different bursts or burst sets.

In some variants, measurement reporting may be transmitted on uplink or sidelink. A SS block configuration or measurement configuration may be transmitted on downlink or sidelink.

It may be considered that the measurement time interval covers transmission and/or signaling not included in a SS block, and/or covers data signaling (e.g., on a data channel or shared channel, in particular physical shared channel like a PDSCH). Such signaling may be scheduled and/or configured, and/or indicated to the UE.

The measurement reporting may be based on measurement/s performed during the measurement time interval, which may be configured by the measurement configuration. Measurement reporting (and/or measurements) may represent one or more different measures (e.g., value/s or parameter/s), e.g. a signal strength and/or quality measure.

Measurement reporting may comprise transmitting or signaling one or more reports, e.g., in one or more messages. Measurement reporting, and/or measurements, may in particular pertain to, and/or represent, signal strength and/or signal quality measurements, and/or represent mobility information, e.g. for handover and/or cell selection. It may be considered that measurement reporting and/or measurement may pertain to one or more cells, and/or to one or more carriers or carrier structures, and/or to one or more RATs (Radio Access Technology). In particular, it may pertain to a serving cell and one or more neighboring cells.

Measurement reporting may comprise signaling, and/or be in response to received and/or scheduled reference signaling. Transmitting measurement reporting may comprise performing measurement/s and/or determining measurement information, e.g. based on reference signaling. Measurement reporting may comprise processing measurement results and/or samples, e.g. to provide measurement information in a desired format, e.g. a configured or configurable or predefined format. Measurement reporting pertaining to a measurement time interval may provide measurement information (e.g., on signal strength or quality and/or interference) integrated over the whole time interval, or may be provided with a higher resolution and/or provide information over subintervals of the measurement time interval. Accordingly, measurements may be performed to integrate samples over the whole time interval, and/or over smaller subintervals.

A measurement reporting configuration may indicate one or more parameters for measurements and/or measurement reporting, e.g. resource/s and/or timing and/or periodicity and/or one or more cells and/or carriers and/or signaling for performing the measurements and/or reporting thereon, and/or the format for reporting.

A SS block configuration may indicate resource/s for SS blocks, and/or periodicity and/or timing and/or structure (e.g., burst and/or series), and/or content, and/or bandwidths of signals transmitted within SS blocks, and/or numerology of signals transmitted within SS blocks e.g. types of signaling or channel/s, like PSS and/or SSS and/or a broadcast channel like PBCH.

It may be considered that the SS block configuration may configure synchronisation signals or signaling, e.g. PSS/SSS aka NR-PSS/NR-SSS.

Measurement/s on one component of signal quality measurement may be performed over the measurement time interval, e.g. interference (e.g., RSSI) or signal strength measurement, whereas the other component may be measured over a second, different, time interval. The signal quality may be determined and/or estimate as a combination of such measurements over different time intervals.

The SS block configuration may be predefined and/or configured or configurable, in particular configured to the UE by the network or a network node. The SS block configuration may be determined by a radio node like a network node. It may be considered that the measurement configuration is determined by the radio node like a network node, e.g. based on operation conditions and/or use case.

There is also described a program product comprising instructions causing processing circuitry to control and/or perform a method as described herein.

Moreover, there is considered a carrier medium arrangement carrying and/or storing a program product as described herein.

Transmitting measurement reporting or a measurement report may comprise, and/or be based on, determining a corresponding report, and/or a measure for reporting, for example a signal quality measure. Such determining may comprise estimating a measure or report, and/or performing calculations based on measurement/s, and/or combining measurement results or samples or measures.

According to the approaches described herein, the SS block configuration may be considered for measurements, in particular signal quality measurements, improving measurement reliability, in particular for mobility-related issues.

BRIEF DESCRIPTION OF THE DRAWINGS

The drawings are provided to illustrate concepts and approaches described herein, and are not intended to limit their scope. The drawings comprise.

DETAILED DESCRIPTION

Figure 1:
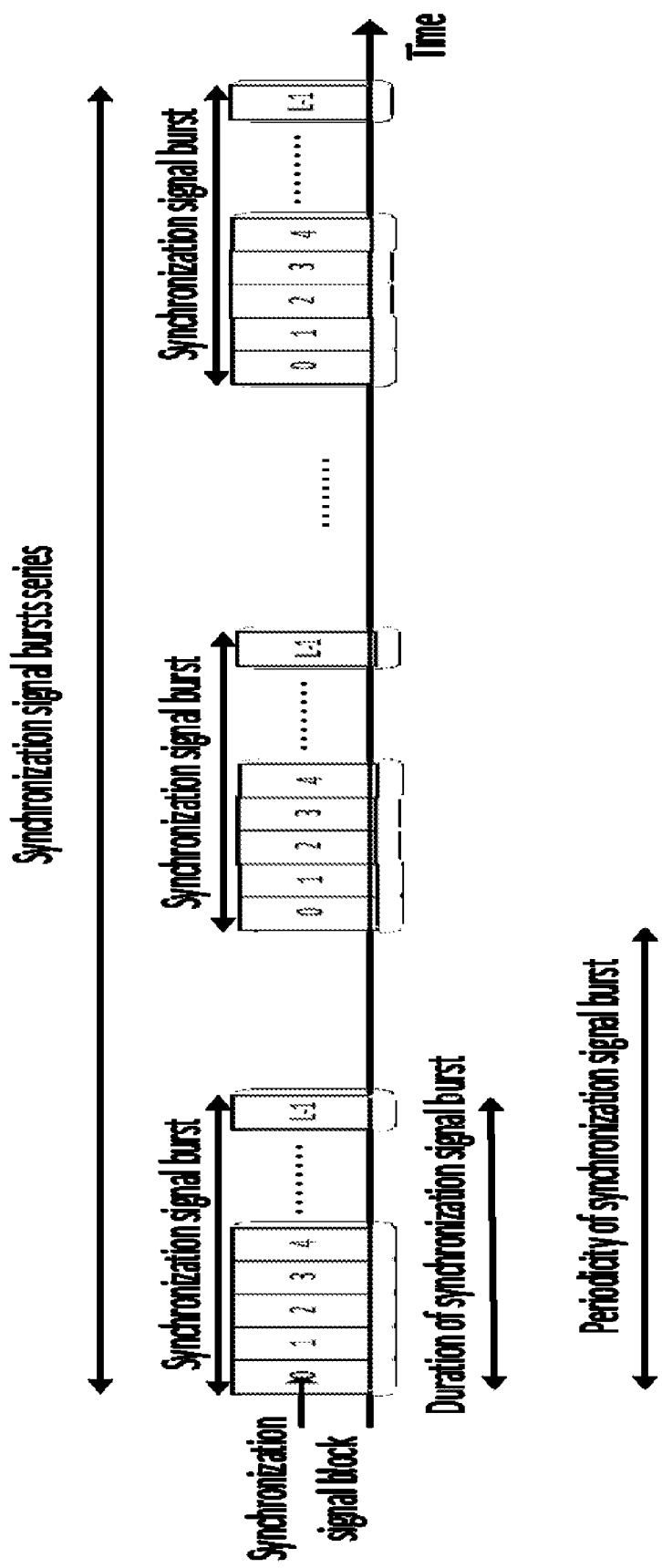
FIG. 1, showing exemplary SS burst structures.

In the following, there are discussed exemplary scenarios in the context of New Radio (NR). Other scenarios may be considered.

In NR, multiple numerologies are supported for operation of signals between the UE and the network node e.g. transmission and/or reception of signals. The term numerology may characterize any one or more of: frame duration, subframe, TTI duration, slot duration, min-slot duration, symbol durations subcarrier spacing (SCS), number of subcarriers per physical channel (e.g. RB), number of RBs within the bandwidth etc. A scaling approach (based on a scaling factor $2^N$, N=1, 2, . . . ) is considered for deriving subcarrier spacings for NR: 15 kHz, 30 kHz, 60 kHz, 120 KHz, 240 KHz etc. The numerology-specific time resource durations (e.g. slot, subframe etc) can then be determined in ms based on the subcarrier spacing: subcarrier spacing of $(2^N*15)$ kHz gives exactly $½^N$ ms. Table A illustrates examples of numerology for NR in terms of carrier spacings, slot duration, symbol duration, CP (Cyclic Prefix) length etc. The SCS used for transmitting SS block can be different than the SCS used for transmitting signals other than SS block.

TABLE A

Examples of numerologies in NR assuming normal CP length

| Numerology attribute | Numerology related parameter values | | | | |
|---|---|---|---|---|---|
| Subcarrier spacing | 15 kHz | 30 kHz | 60 kHz | 120 kHz | 240 kHz |
| Slot duration | 500 µs | 250 µs | 125 µs | 62.5 µs | 31.25 µs |

TABLE A-continued

Examples of numerologies in NR assuming normal CP length

| Numerology attribute | Numerology related parameter values | | | | |
|---|---|---|---|---|---|
| OFDM symbol, duration | 66.67 µs | 33.33 µs | 16.67 µs | 8.335 µs | 4.1675 µs |
| Cyclic prefix, duration | 4.76 µs | 2.38 µs | 1.19 µs | 0.595 µs | 0.2975 µs |
| OFDM symbol including cyclic prefix | 71.43 µs | 35.71 µs | 17.86 µs | 8.93 µs | 4.465 µs |

Exemplary SS block (Synchronisation Signaling block) and SS burst configurations are described in the following.

A SS block may represent a resource structure, in particular a time/frequency resource structure. It may be considered that specific signaling and/or channels are assigned to a SS block. Such signaling may for example comprise synchronisation signaling like primary and/or secondary synchronisation signaling, for example PSS (Primary Synchronisation Signaling), e.g. NR-PSS, and/or SSS (Secondary Synchronisation Signaling), e.g. NR-SSS. One or more broadcast channel/s, in particular physical broadcast channel/s, may be assigned to a SS block. In particular, a Physical Broadcast Channel (PBCH) like NR-PBCH may be assigned to a SS block. There may be considered different types of SS blocks, which may differ in amount of resources (e.g., extension in time (duration) and/or frequency (bandwidth) domain/s, in particular in number of resource elements, and/or code) and/or channels and/or signalings assigned. A SS block or block type may be configured or configurable.

For a given frequency band (e.g., carrier and/or carrier structure and/or PRB or PRB group), an SS block may correspond to N OFDM symbols, e.g. based on the default or a configured or configurable subcarrier spacing, and/or N symbols may contain NR-PSS, NR-SSS and NR-PBCH. For example, NR-PSS and NR-SSS may be transmitted in one, but in separate symbols. The NR-PBCH may be transmitted over 2, 3 or 4 symbols. A UE may be able to identify at least OFDM symbol index, slot index in a radio frame and radio frame number from an SS block. This information may be represented by the signaling and/or resource structure of the SS block. A single set of possible SS block time locations (e.g., with respect to radio frame or with respect to SS burst set) may be specified per frequency band. At least for multi-beams case, at least the time index of SS-block may be indicated to the UE. The position(s) of actual transmitted SS-blocks can be informed for supporting measurements, in particular CONNECTED/IDLE mode measurement, and/or for supporting a UE in CONNECTED to receive DL data/control signaling, e.g. in unused SS-blocks, and/or for potentially supporting a UE in IDLE mode to receive DL data/control signaling in unused SS-blocks. The SS block configuration may further indicate bandwidth of signals in the SS blocks and/or numerology of the signals in the SS blocks (e.g. subcarrier spacing).

Signaling, or a channel, may be considered to be assigned or associated to a SS block, if the signaling, or signaling associated to the channel, is transmitted on, and/or carried on, and/or configured for, and/or scheduled for, resources, in particular time/frequency resources, of the SS block.

A SS block may pertain to, e.g. be embedded and/or included and/or arranged in, a transmission timing structure, in particular in a physical resource block (PRB) or PRB group or slot or subframe. It may be considered that a SS block extends in frequency to cover frequency band like a carrier, or a part of a carrier, in particular a predefined and/or configured or configurable number of subcarriers. In particular, the SS block may be arranged (in frequency domain) to include and/or to represent and/or embedding and/or around a central carrier frequency, which may be represented by a subcarrier or subcarrier border, to which it may be considered to pertain. A SS block may pertain to a specific cell or carrier, or to a specific cell or carrier structure, in particular the one it is embedded and/or included in, or which it represents.

A SS burst may comprise, and/or be composed of one or multiple SS block/s. A number, in particular, a maximum number of SS-blocks, L, within SS burst set may be dependent on carrier frequency, e.g. of the cell or carrier to which the SS burst or the SS blocks pertains, and/or may be configured or configurable or time-variable, e.g. according to a timing pattern. In some variants, a maximum number is predefined, and the number of blocks up to the maximum may be configured or configurable or variable, e.g. according to a timing pattern. The maximum number of SS-blocks within SS burst set, L, for different frequency ranges may for example be:

For frequency range up to 3 GHz, L=4
For frequency range from 3 GHz to 6 GHz, L=8
For frequency range from 6 GHz to 52.6 GHz, L=64

Certain minimum number of SS blocks transmitted within each SS burst set may be used to define UE measurement performance requirements.

It may be considered that the transmission of SS blocks within a SS burst set may be confined to a 5 ms window regardless of SS burst set periodicity. Within this 5 ms window, a number of possible candidate SS block locations is L (as described above). The SS blocks within the same SS burst set in a cell may or may not be contiguous in time.

A SS burst set (which may also be referred to as series) may comprise or be composed of one or multiple SS burst/s, wherein the number of SS bursts within a SS burst set may be finite, e.g. configured or configurable or predefined. At least one periodicity for a SS burst set may be supported. From UE perspective, SS burst set transmission may be periodic. At least for initial cell selection, a UE may assume a default periodicity of SS burst set transmission for a given carrier frequency (e.g., one of 5 ms, 10 ms, 20 ms, 40 ms, 80 ms, or 160 ms). The UE may assume that a given SS block is repeated with a SS burst set periodicity. By default, the UE may neither assume the network node (e.g. gNB) transmits the same number of physical beam(s), nor the same physical beam(s) across different SS-blocks within an SS burst set.

The SS blocks transmitted from or in different cells on the same carrier frequency may be time-aligned or overlap fully or at least in part, or the beginning of the SS blocks may be time-aligned (e.g., when the actual number of transmitted SS blocks is different in different cells).

FIG. 1 shows example configurations of SS blocks, SS bursts and SS burst sets/series.

A signal quality measurement may comprise signal strength and/or interference measuring components. A signal quality measurement may be represented as a ratio of signal strength and interference in linear scale, and/or difference between signal strength and interference in log scale. In an example, a quality measure ($Q_{rx}$), e.g. of a signal quality indication and/or pertaining to signal quality, may be expressed as follows:

$$Q_{rx} = \frac{P_{rx}}{I + N_o}, \quad (1)$$

wherein $P_{rx}$ is the received power of a measured signal, e.g. pilot or reference signal/signaling (such that $P_{rx}$ may be considered to represent a signal strength component), and I represents an interference measure. Depending upon the type of quality measurement, the component I for example can represent interference on the pilot, or the total interference on the entire carrier or simply inter-cell interference plus noise. $N_0$ may represent a noise offset and/or a background noise e.g., excluding interference from any distinct source. As an example, $N_0$ may represent thermal noise which depends on at least bandwidth of measured signal and temperature.

Pilot signaling may be seen as an example of reference signaling, which in particular may be transmitted with a signal strength known by a receiver. Pilot signaling may be broadcast, and/or transmitted cell-wide, for a specific cell or carrier or transmission bandwidth.

Strength of a signal or signaling (signal strength) may be represented, for example, by power and/or energy, and/or respective density/ies, and/or amplitude/s, e.g. of received signaling for received power, or as transmitted for transmitted power.

Signal strength (e.g. RSRP) and/or interference and/or signal quality may be measured on reference signaling or pilot signaling. In NR, the NR-RSRP may be measured on NR-SSS. Another example of NR signal strength is NR CSI-RSRP, which may be measured on CSI-RS.

Interference may include interference from one or several sources, such as reference signals, control channels, data channels, noise etc. Examples of reference signals or pilot signals are primary synchronization signal (PSS), NR-PSS, secondary synchronization signal (SSS), NR-SSS, cell specific reference signal (CRS), reference signal (RS), CSI-RS, positioning reference signal (PRS), demodulation reference signal (DM-RS), MBMS RS, etc.

Examples of signal quality measures or parameters or representations are SNR, SINR, reference signal quality (RSRQ), CPICH (Common Pilot CHannel) Ec/No, CSI (Channel State Information), CQI (Channel Quality Information), CSI-RSRQ, etc. Measurement reporting may comprise and/or represent one or more signal quality measures.

Signal quality measurements (depending upon the measurement) may be performed on a serving cell (or multiple serving cells in multi-carrier and/or CoMP, Coordinated MultiPoint), and in some variants on one or more neighboring cells. The neighbor cells may have the serving carrier frequency, or a different carrier frequency. Such a carrier frequency may correspond to an inter-frequency carrier, or an inter-RAT (Radio Access Technology) carrier.

Generally, signal quality measurement/s or indication or information may be based on, and/or represent, signal strength and/or interference measurements and/or information. Signal quality may in some variants be considered a function of signal strength, and interference and/or noise.

A reference signal received power (RSRP) (e.g., of RSRQ, which may be based thereon) may be defined as the linear average over the power contributions (in [W]) of the resource elements that carry cell-specific reference signals within the considered measurement frequency bandwidth.

It may be considered that signals, like NR-SSS signals, within each SS block are transmitted contiguously over 50 or more, 100 or more, e.g. 127, subcarriers in frequency domain. Moreover, in NR, SS blocks transmitted in different cells on the same carrier may be fully or partly time aligned. Due to the SS block structure, signal quality measurement performed over SS signals (e.g. NR-SSS) may not correctly represent the "true" signal quality of the cell. Instead, it will reflect the quality of NR-SSS, in particular interference on NR-SSS. This may lead to inappropriate mobility decisions (e.g., in context of handover), and may degrade UE and system performance.

There is suggested a UE adapted to perform, and or a method of operating a UE comprising performing one or more signal quality measurement/s based on one or more of the following actions:

UE determines SS block configuration which is used or is expected to be used in a measured cell, UE uses the determined SS block configuration for determining a measurement duration (Dm), which comprises of at least a time resource that does not contain any signal transmitted within any SS block in the measured cell, UE measures at least one component of a signal quality measurement over the determined duration, Dm, where Dm starts from a reference time. Several examples of reference times are described herein. In one example, the reference time is the start of a particular symbol in the SS block within the SS burst set of a reference cell. Examples of a reference cell are measured cell (i.e. cell on which the measurement is being done by the UE), a serving cell or any cell which has been detected by the UE on a carrier on which the UE measures the cell(s). In one specific example, the reference time is the start of first symbol in first SS block in the SS burst set of the measured cell. In yet another specific example, the reference time is the start of a first symbol in the detected SS block in the SS burst set of the reference cell e.g. measured cell, serving cell etc. In yet another specific example, the reference time is the start of a symbol in the SS block associated with the strongest beam in the SS burst set of the reference cell e.g. measured cell, serving cell etc. A strongest beam is the one which signal level (e.g. signal strength, signal quality such as SNR or SINR, etc.) is largest among all the detected beams.

Examples of parameters belonging to, and/or indicated by, the SS block configuration may comprise one or more of: number of SS blocks within SS burst set, whether SS blocks within the SS burst set are contiguous or non-contiguous in time etc.

In one example, Dm may be expressed as the RSSI part or interference part of the quality measurement which may be measured over time duration ($D_m$) starting from a reference time according to the following expression:

$$Dm = g(M1, M2, L, T_{SS-symbol})$$

Where M1 is an integer (e.g. M1=2), M2 is the number of symbols in the SS block, L is the number of SS blocks per SS burst set and $T_{SS-symbol}$ is the symbol duration of each symbol in SS block. These parameters can be pre-defined or configured to the UE, e.g. by the network node.

In one example, the UE may estimate (measure and/or determine based on measurement) only one of the components (e.g. a second component (C2)) of signal quality measurement over Dm, while perform a first component (C1) of the signal quality measurement only over symbols within the SS blocks (e.g. over NR-SSS). In another example, the UE may estimate a first component (C1) and also C2) of signal quality measurement over Dm. Examples of C1 and C2 are signal strength and interference (e.g. RSSI) respectively. The duration, Dm, is also called as snapshot or sample duration. The UE may combine multiple snapshots to estimate the signal quality measurement.

The enhanced signal quality measurement in NR indicates true signal quality experienced by the UE in the measured cell.

The mobility performance of any mobility procedure which uses the signal quality measurement is enhanced.

The user and system throughput is maximized since the UE is handed over to a cell which has least amount of load and interference.

The non-limiting term "UE" is used. The UE herein can be any type of wireless device capable of communicating with network node or another UE over radio signals. The UE may also be radio communication device, target device, device to device (D2D) UE, machine type UE or UE capable of machine to machine communication (M2M), a sensor equipped with UE, iPAD, Tablet, mobile terminals, smart phone, laptop embedded equipped (LEE), laptop mounted equipment (LME), USB dongles, Customer Premises Equipment (CPE) etc.

Also, the generic term "network node", may be used, which may refer to any kind of network node, for example a radio network node such as base station, radio base station, base transceiver station, base station controller, network controller, gNB, NR BS, evolved Node B (eNB), Node B, Multi-cell/multicast Coordination Entity (MCE), relay node, access point, radio access point, Remote Radio Unit (RRU) Remote Radio Head (RRH), a multi-standard BS (a.k.a. MSR BS), a core network node (e.g., MME, SON node, a coordinating node, positioning node, MDT node, etc.), or even an external node (e.g., $3^{rd}$ party node, a node external to the current network), etc. The network node may also comprise a test equipment.

The term "radio node" used herein may be used to denote a UE or a radio network node.

The embodiments are applicable to single carrier as well as to multicarrier or carrier aggregation (CA) operation of the UE in which the UE is able to receive and/or transmit data to more than one serving cells. The term carrier aggregation (CA) is also called (e.g. interchangeably called) "multi-carrier system", "multi-cell operation", "multi-carrier operation", "multi-carrier" transmission and/or reception. In CA one of the component carriers (CCs) is the primary component carrier (PCC) or simply primary carrier or even anchor carrier. The remaining ones are called secondary component carrier (SCC) or simply secondary carriers or even supplementary carriers. The serving cell is interchangeably called as primary cell (PCell) or primary serving cell (PSC). Similarly, a secondary serving cell may be interchangeably called secondary cell (SCell) or secondary serving cell (SSC).

The term "signaling" used herein may refer to any of: high-layer signaling (e.g., via RRC or a like), lower-layer signaling (e.g., via a physical control channel or a broadcast channel), or a combination thereof. The signaling may be implicit or explicit. The signaling may further be unicast, multicast or broadcast. The signaling may also be directly to another node or via a third node.

The term "radio measurement" used herein may refer to any measurement performed on radio signals. Radio measurements can be absolute or relative. Radio measurement may be called as signal level which may be signal quality and/or signal strength. Radio measurements can be e.g. intra-frequency, inter-frequency, CA, etc. Radio measurements can be unidirectional (e.g., DL or UL) or bidirectional (e.g., RTT, Rx-Tx, etc.). Some examples of radio measurements: timing measurements (e.g., TOA, timing advance, RTT, RSTD, Rx-Tx, propagation delay, etc.), angle measurements (e.g., angle of arrival), power-based measurements (e.g., received signal power, RSRP, received signal quality, RSRQ, SINR, SNR, interference power, total interference plus noise, RSSI, noise power, etc.), cell detection or cell identification, radio link monitoring (RLM), system information (SI) reading, etc. A measurement discussed herein may be considered a radio measurement.

It may be considered that a measurement may comprise power and/or energy and/or quality measurement and/or interference measurement, and/or represent a signal quality measurement. A measurement may comprise sampling received signaling (e.g., from one or more beams, or one or more carriers or channels or bandwidths), and/or processing based on such sampling, e.g. determine interference and/or distinguish different types of signaling and/or transmissions and/or transmission sources. Measurements may in particular be performed on reference signaling, which may be associated to, and/or transmitted on, or scheduled for transmission on, a carrier or transmission timing structure or resource structure or cell or channel or physical resource block or PRB group.

The term measurement performance used herein may refer to any criteria or metric which characterizes the performance of the measurement performed by a radio node. The term measurement performance is also called as measurement requirement, measurement performance requirements etc. The radio node has to meet one or more measurement performance criteria related to the performed measurement. Examples of measurement performance criteria are measurement time, number of cells to be measured with the measurement time, measurement reporting delay, measurement accuracy, measurement accuracy wrt a reference value (e.g. ideal measurement result) etc. Examples of measurement time are measurement period, cell identification period, evaluation period, etc.

The term time resource used herein may correspond to any type of physical resource or radio resource expressed in terms of length of time. Examples of time resources are: symbol, time slot, subframe, radio frame, TTI, interleaving time, etc.

The term TTI used herein may correspond to any time period (T0) over which a physical channel can be encoded and optionally interleaved for transmission. The physical channel is decoded by the receiver over the same time period (T0) over which it was encoded. The TTI may also interchangeably called as short TTI (sTTI), transmission time, slot, sub-slot, mini-slot, mini-subframe etc.

A UE may adaptively perform a signal quality measurement based on the following principle:
- UE determines SS block configuration which is used or is expected to be used in a measured cell,
- UE uses the determined SS block configuration in step-1 for determining a measurement duration (Dm), which comprises of at least a time resource that does not contain any signal transmitted within any SS block in the measured cell,
- UE measures at least one component of a signal quality measurement over the determined duration, Dm.
- UE uses the performed measurements for one or more operational tasks (operations) e.g. transmitting the measurement results (measurement reporting) to a network node or to another UE, uses the measurement results for internal operations (e.g. cell change (e.g. cell selection, cell reselection), positioning etc).

The measurement may be performed upon an internal trigger or triggering condition in the UE or upon a request from another node or periodically.

The aim of the adaptation of the signal quality measurement procedure is to ensure that the interference component of the signal quality measurement includes at least some contributions from resources which don't contain any SS signal (e.g. NR-SSS, NR-PSS and NR-PBCH).

Determination of SS block configuration is discussed in more detail.

In this step the UE determines information about SS block configuration, which comprises of one or more of: SS blocks within SS burst, SS blocks within a pre-defined or configured time period (e.g., a subframe or 5 ms time period), number of SS blocks within SS burst set and SS burst set periodicity, composition of SS blocks within a lot or time resource, number of different beams or beam IDs associated with different SS blocks, SS block numerology, SS block contents or signals/channel comprised in SS blocks, an indication of actually transmitted/not transmitted SS blocks or SS bursts out of those configured (e.g., configured according to the periodicity or a pattern), transmit power difference between the signals/channels within an SS block (such as a power offset between PSS and/or SSS and/or DMRS for PBCH), at least one identity used for generation one or more signal sequences within SS block, etc. The determined SS block configuration is used or is expected to be used for transmitting SS signals (i.e. NR-PSS, NR-SSS and NR-PBCH) in a measured cell i.e. the cell on which signals the UE is to perform a signal quality measurement.

The UE can determine the information about SS block configuration for each carrier frequency and/or cell based on any of the following mechanisms:
- By receiving information from another UE or from a network node e.g. in measurement configuration or in system information,
- By using default or pre-defined information e.g. SS burst periodicity of 20 ms and number of SS blocks within each SS burst=L where L depends on carrier frequency of the measured cell
- Based on historical data or statistics e.g. previously or recently used parameters associated with the SS block configuration for certain carrier frequency.
- By detecting the cell and reading system information for that cell indicating the SSB properties for the detected cell and/or per carrier.

In yet another example, the UE can determine the information about SS block configuration for each cell or group of cells on a carrier frequency based on any of the following mechanisms:
- By receiving information from another UE or from a network node e.g. in measurement configuration or in system information,
- By using default or pre-defined information e.g. SS burst periodicity of 20 ms and number of SS blocks within each SS burst=L where L depends on the measured cell on a carrier
- Based on historical data or statistics e.g. previously or recently used parameters associated with the SS block configuration for certain cell on a carrier frequency.
- By detecting the cell and reading system information for that cell indicating the SSB properties for the detected cell and/or per carrier.

Determination of measurement duration for signal quality measurement is discussed in more detail. In this step the UE applies the determined SS block configuration information for determining the time duration (Dm) over which the UE shall estimate at least one of the components of the signal quality measurement e.g. interference, RSSI etc. The time duration, Dm, starts from a reference time or from a reference time plus an offset (signaled, pre-defined or configurable, e.g., counted in the number of symbols of a specific numerology). One example of the reference time is the first symbol containing the first SS block in the SS burst set of a measured cell in which the measurement is performed by the UE. Another example of the reference time for starting the time duration, Dm start, is the start of certain reference time resource. Examples of reference time resource are the start of the slot (i.e. slot boundary) of the measured cell in which the UE performs the RSSI part of the measurement, start of the frame of the measured cell in which the RSSI is measured, start of TTI, start of mini-slot, a reference time of the serving cell, etc. If there is some guard time period (e.g., with no transmission and/or no reception), it may also be taken into account when determining Dm. Another example is to start at the symbol associated to the strongest beam the UE has detected at the serving cell.

In one example the UE estimates only one of the components (e.g. a second component (C2)) of signal quality measurement over Dm, while perform a first component (C1) of the signal quality measurement only over symbols within the SS blocks (e.g. over NR-SSS). In another example the UE estimates a first component (C1) and also C2 of signal quality measurement over Dm. Examples of C1 and C2 are signal strength and interference (e.g. RSSI) respectively. The signal strength and the interference may be an average per time unit, e.g., symbol, or a function combining their values over multiple time units, e.g., symbols, if measured over more than one time unit.

The key aspect of Dm is that it consists of at least one time resource in which non-SS block signals are transmitted. In another example the at least one time resource contains at least one symbol which contains data signals or where data signals can be transmitted. Examples of non-SS signals are PDSCH, PDCCH etc. Examples of data signals are signals transmitted in a data channel e.g. in PDSCH.

The UE may adapt its window based on cell-specific SSB information for a given carrier. The SSB structure from neighbor information can be used by the UE to adapt the Dm such a way that the UE knows which symbols in the neighbor cells contain SSB symbols and/or potentially data/control channel symbols.

In another example Dm may consists of: time resources containing both SS block signals (e.g. NR-PSS, NR-SSS and NR-PBCH etc) and also at least one time resource containing non-SS block signals (e.g. PDSCH).

In general parameter, Dm, can be expressed as follows:

$$Dm=f(T1,T2) \quad (1)$$

In another example Dm is expressed by another general expression as follows:

$$Dm=f2(Tmax,f(T1,T2)) \quad (2)$$

Examples of functions (f and f2) are maximum, minimum, average, xth percentile, weighted average, sum, join function (over two sets of symbols), intersection function, etc.

In the above expressions (1) and (2):
First time period (T1) consists of K1 symbols, which contain one or more SS blocks,
Second time period (T2) consists of K2 symbols, which contain one or more non-SS block signals.

In one example, the sets of K1 and K2 symbols do not overlap. In another example, the two sets overlap at least in part, e.g., when the measurement bandwidth is larger than the bandwidth of one or more signals/channels comprised in SS block.

Where T1 and T2 can be contiguous or non-contiguous. The set of K1 symbols within T1 containing SS block signals can be contiguous or non-contiguous. The set of K2 symbols within T2 containing non-SS signals can be contiguous or non-contiguous.

The duration of T1 and/or T2 depends on at least the SS block configuration.

In one specific example, T1=T2 and K1=K2, whereas in another example T2=M*T1, where M depends on SS block configuration e.g. parameter L. For example, M=L*Nss where Nss is number of symbols in each SS block. As an example, Nss=4 symbols. For example M=256 symbols if L=64 and Nss=4.

Specific examples of functions in (1) and (2) are:

$$Dm=T1+T2 \quad (3)$$

$$Dm=T2, \text{ i.e. } T1=0 \quad (4)$$

The expression (4) can be used by the UE for estimating the RSSI or interference part of the quality measurement only in non-SS symbols.

$$Dm=T1, \text{ i.e. } T2=0 \quad (5)$$

The expression (5) can be used by the UE for estimating the RSSI or interference part of the quality measurement when the SS blocks are transmitted or expected to be transmitted in the measured cell in non-contiguous time resources. In this case between one or more consecutive SS blocks there is at least one non-SS block signal. For example, if there are 4 SS blocks per SS burst, then any two successive SS blocks are separated by at least one symbols containing non-SS signals.

$$Dm=\text{MAX}(Tmax,(T1+T2)) \quad (6)$$

$$Dm=\text{MAX}(Tmax,T2) \quad (7)$$

In an example, Tmax=5 ms, or Tmax is a time within which SS blocks comprised in SS burst or SS burst set are transmitted. In another example, Tmax=measurement gap length, which can be 6 ms etc. Tmax may be the duration over which at least L number of SS blocks are transmitted, periodicity of SS burst which contains L number of SS blocks, etc.

In yet another example of Dm, the RSSI part or interference part of the quality measurement may be measured over time duration ($D_m$) starting from a reference time according to the expression in (8). An example of the reference time is the first symbol containing the first SS block in the SS burst set of a measured cell in which the measurement is performed by the UE. Another example of the reference time when the Dm starts is the start of a time slot of the measured cell in which the UE performs the RSSI part of the measurement.

$$Dm=f3(M1,M2,L,T_{SS\text{-}symbol}) \quad (8)$$

wherein:
M1 is an integer or a factor used to ensure that the RSSI is measured over at least certain number of data symbols.
M2 is the number of number of symbols in each SS block. This is likely to be a fixed number defined in RAN1 specification.
L is the number of or the maximum number of SS blocks within the SS burst set used for signal quality measurement. L depends on carrier frequency of the cell.
$T_{SS\text{-}symbol}$ is the duration of the symbol in the SS block. This may depend on subcarrier spacing of SS block.
M1 may be pre-defined, derived based on a pre-defined rule or may be received from, and/or configured by, another node.

A specific example of the function in (8) is expressed in (9):

$$Dm=M1*M2*L*T_{SS\text{-}symbol} \quad (9)$$

Assuming M1=2, M2=4, then according to (9), the value of Dm=8*L*$T_{SS\text{-}symbol}$.

Yet another specific example of the function in (8) is expressed in (10):

$$Dm=\text{MAX}(M3,(M1*M2*L*T_{SS\text{-}symbol})) \quad (10)$$

Where M3=maximum time in which the SS burst set can be transmitted. As an example M3=5 ms.

In the above expressions (8-10), the values of the parameters M1, M2, M3 and L can be pre-defined or configured to the UE by the network node (e.g. via RRC message).

Yet another example is illustrated in equation (11), which may be used when the SS blocks are consecutive in time, and additional M1 symbols before or after may be added:

$$Dm=(M1+M2*L)*T_{SS\text{-}symbol} \quad (11)$$

In a further example, M1 may be 0 (in eq. (11)) or may be 1 (in eqs. (9-10)), when the measurement bandwidth is larger than the bandwidth of some or all signals/channels comprised in SS block.

Figure 2:
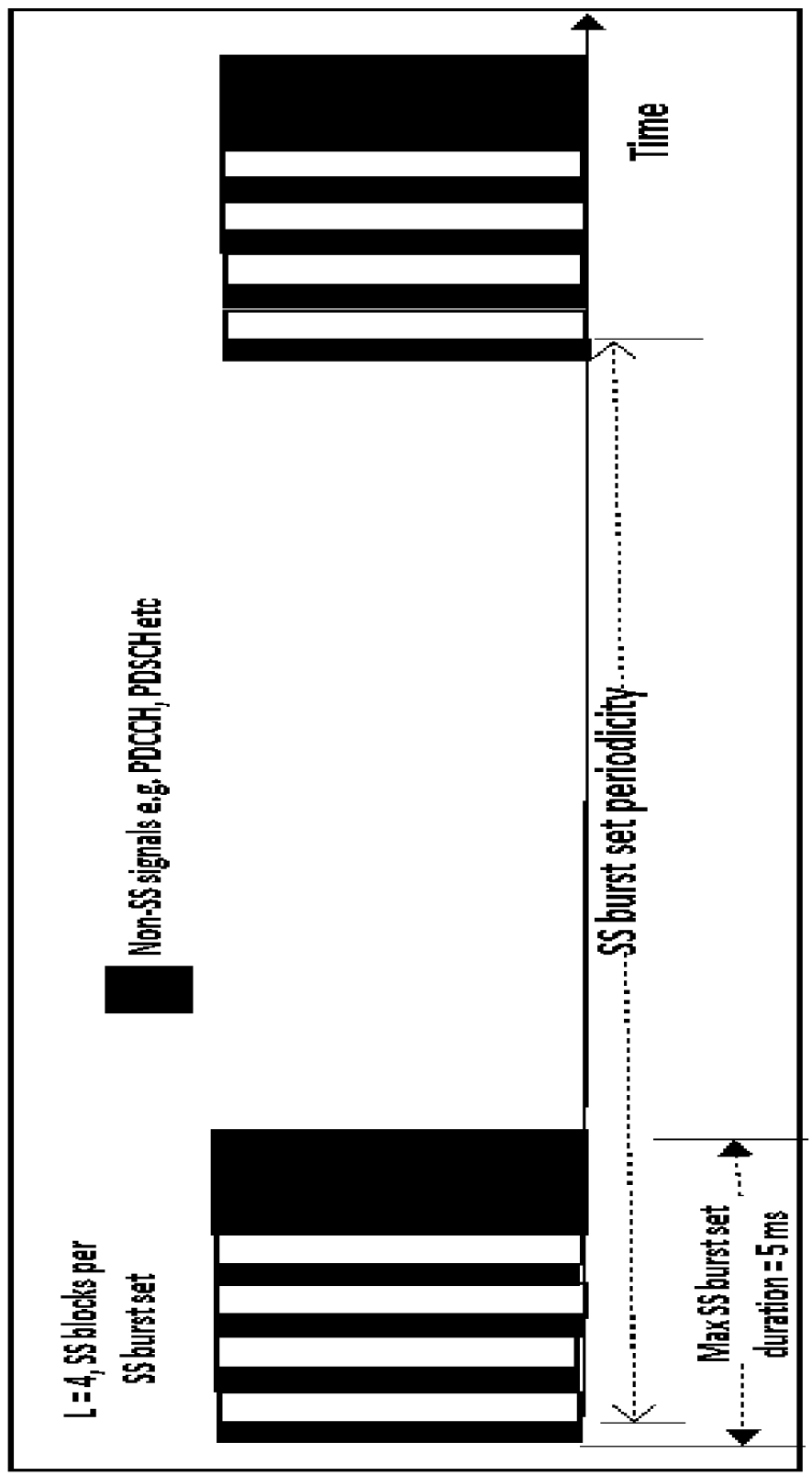
FIG. 2, showing an exemplary SS burst structures with intervals between the SS blocks.

An example of SS blocks within SS burst set is shown in FIG. 2. All SS blocks are within 5 ms. RSSI is measured within 5 ms to ensure that it can be measured in gaps and also it should include at least certain non-SS signals e.g. PDSCH etc. Between the SS blocks, there are intervals, which may be covered by the measurement time interval.

Examples of different combination of parameters related to the SS block for maximum value of L are shown in table 1 (see below). The table shows that the maximum duration shall be much less than 5 ms even when the value of L is maximum. In case the configured value of L is shorter than the maximum value, then $T_{RSSI}$ will even be smaller.

One specific example of signal quality measure for signal quality measurements, synchronization signal received quality (SSRQ) is expressed in table 2.

Estimation of signal quality measurement over determined duration, Dm is discussed in the following. The duration, Dm, may also be referred to as snapshot or sample duration or sampling time period. For example, the UE may estimate or measure at least one component (e.g. RSSI or Interference) over Dm, and also may estimate or measure another component (e.g. signal strength such as RSRP or SSRP) over the same or another snapshot duration (Ds), and may estimate or determine the signal quality for each pair of snapshots e.g. RSRP/RSSI etc. As an example, Ds can be 1 ms. The value of Ds may also depend on SS block configuration e.g. number of SS blocks in a SS burst, etc. Each such ratio of snapshot is called herein as signal quality snapshot. The UE may obtain each signal quality snapshot at periodic or aperiodic instances. For example, the UE may obtain one signal quality snapshot on the measurement cell every 40 ms in non-DRX (DRX=Discontinuous Reception, a power-saving operation mode), or when DRX cycle≤40 ms. In a DRX cycle larger than 40 ms, for example, the UE obtains one signal quality snapshot on the measurement cell at least once every DRX cycle.

The UE may combine multiple snapshots or samples of signal quality snapshot to estimate the overall signal quality measure representing a signal quality measurement. The combining of multiple snapshots can be based on a function. Examples of functions are maximum, sum, average, Xth percentile etc. The UE may perform the quality measurement in any RRC state e.g. idle state, connected state etc.

Using measurement results for operational tasks is discussed below.

The UE may use the estimated or determined signal quality for performing one or more operational tasks. Examples of tasks are mobility procedure, positioning, reporting the measurement results to a network node (e.g. serving cell), reporting the measurement results to another UE, which may be capable of D2D operation, etc. The network node may use the received results for one or more operational tasks e.g. mobility, positioning etc.

Examples of UE mobility procedures in low activity RRC states are cell selection and cell reselection, including intra-frequency, inter-frequency and inter-RAT (e.g. between UTRA to LTE, etc.). Examples of low activity RRC states are RRC idle state, RRC inactive state etc. Examples of UE mobility procedures in high activity RRC states are cell change, handover, RRC connection re-establishment, RRC connection release with direction to target cell, primary component carrier (PCC) change in CA or PCell change in CA etc. Examples of high activity RRC states are RRC connected state, RRC active state etc.

Figure 3:
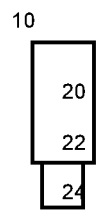
FIG. 3, showing an exemplary radio node implemented as user equipment or terminal.

FIG. 3 schematically shows a radio node, in particular a terminal or wireless device 10, which may in particular be implemented as a UE (User Equipment). Radio node 10 comprises processing circuitry (which may also be referred to as control circuitry) 20, which may comprise a controller connected to a memory. Any module of the radio node 10, e.g. a communicating module or determining module, may be implemented in and/or executable by, the processing circuitry 20, in particular as module in the controller. Radio node 10 also comprises radio circuitry 22 providing receiving and transmitting or transceiving functionality (e.g., one or more transmitters and/or receivers and/or transceivers), the radio circuitry 22 being connected or connectable to the processing circuitry. An antenna circuitry 24 of the radio node 10 is connected or connectable to the radio circuitry 22 to collect or send and/or amplify signals. Radio circuitry 22 and the processing circuitry 20 controlling it are configured for cellular communication with a network, e.g. a RAN as described herein, and/or for sidelink communication. Radio node 10 may generally be adapted to carry out any of the methods of operating a radio node like a terminal or UE disclosed herein; in particular, it may comprise corresponding circuitry, e.g. processing circuitry, and/or modules.

Figure 4:
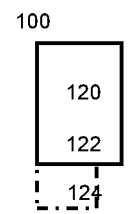
FIG. 4, showing an exemplary radio node implemented as network node, like a gNB or eNB.

FIG. 4 schematically show a radio node 100, which may in particular be implemented as a network node 100, for example an eNB or gNB or similar for NR. Radio node 100 comprises processing circuitry (which may also be referred to as control circuitry) 120, which may comprise a controller connected to a memory. Any module, e.g. transmitting module and/or receiving module and/or configuring module of the node 100 may be implemented in and/or executable by the processing circuitry 120. The processing circuitry 120 is connected to control radio circuitry 122 of the node 100, which provides receiver and transmitter and/or transceiver functionality (e.g., comprising one or more transmitters and/or receivers and/or transceivers). An antenna circuitry 124 may be connected or connectable to radio circuitry 122 for signal reception or transmittance and/or amplification. Node 100 may be adapted to carry out any of the methods for operating a radio node or network node disclosed herein; in particular, it may comprise corresponding circuitry, e.g. processing circuitry, and/or modules. The antenna circuitry 124 may be connected to and/or comprise an antenna array. The node 100, respectively its circuitry, may be adapted to perform any of the methods of operating a network node or a radio node as described herein in particular, it may comprise corresponding circuitry, e.g. processing circuitry, and/or modules.

References to specific resource structures like transmission timing structure and/or symbol and/or slot and/or mini-slot and/or subcarrier and/or carrier may pertain to a specific numerology, which may be predefined and/or configured or configurable. A transmission timing structure may represent a time interval, which may cover one or more symbols. Some examples of a transmission timing structure are subframe, slot and mini-slot. A slot may comprise a predetermined, e.g. predefined and/or configured or configurable, number of symbols, e.g. 6 or 7, or 12 or 14. A mini-slot may comprise a number of symbols (which may in particular be configurable or configured) smaller than the number of symbols of a slot, in particular 1, 2, 3 or 4 symbols. A transmission timing structure may cover a time interval of a specific length, which may be dependent on symbol time length and/or cyclic prefix used. A transmission timing structure may pertain to, and/or cover, a specific time interval in a time stream, e.g. synchronized for communication. Timing structures used and/or scheduled for transmission, e.g. slot and/or mini-slots, may be scheduled in relation to, and/or synchronized to, a timing structure provided and/or defined by other transmission timing structures. Such transmission timing structures may define a timing grid, e.g., with symbol time intervals within individual structures representing the smallest timing units. Such a timing grid may for example be defined by slots or subframes (wherein in some cases, subframes may be considered specific variants of slots). A transmission timing structure may have a duration (length in time) determined based on the durations of its symbols, possibly in addition to cyclic prefix/es used. The symbols of a transmission timing structure may have the same duration, or may in some variants have different duration. The number of symbols in a transmission timing structure may be predefined and/or configured or configurable, and/or be dependent on numerology.

There is generally considered a program product comprising instructions adapted for causing processing and/or control circuitry to carry out and/or control any method described herein, in particular when executed on the processing and/or control circuitry. Also, there is considered a carrier medium arrangement carrying and/or storing a program product as described herein.

A carrier medium arrangement may comprise one or more carrier media. Generally, a carrier medium may be accessible and/or readable and/or receivable by processing or control circuitry. Storing data and/or a program product and/or code may be seen as part of carrying data and/or a program product and/or code. A carrier medium generally may comprise a guiding/transporting medium and/or a storage medium. A guiding/transporting medium may be adapted to carry and/or carry and/or store signals, in particular electromagnetic signals and/or electrical signals and/or magnetic signals and/or optical signals. A carrier medium, in particular a guiding/transporting medium, may be adapted to guide such signals to carry them. A carrier medium, in particular a guiding/transporting medium, may comprise the electromagnetic field, e.g. radio waves or microwaves, and/or optically transmissive material, e.g. glass fiber, and/or cable. A storage medium may comprise at least one of a memory, which may be volatile or non-volatile, a buffer, a cache, an optical disc, magnetic memory, flash memory, etc.

In general, a numerology and/or subcarrier spacing may indicate the bandwidth (in frequency domain) of a subcarrier of a carrier, and/or the number of subcarriers in a carrier and/or the numbering of the subcarriers in a carrier. Different numerologies may in particular be different in the bandwidth of a subcarrier. In some variants, all the subcarriers in a carrier have the same bandwidth associated to them. The numerology and/or subcarrier spacing may be different between carriers in particular regarding the subcarrier bandwidth. A symbol time length, and/or a time length of a timing structure pertaining to a carrier may be dependent on the carrier frequency, and/or the subcarrier spacing and/or the numerology. In particular, different numerologies may have different symbol time lengths.

Signaling may generally comprise one or more symbols and/or signals and/or messages. A signal may comprise one or more bits. An indication may represent signaling, and/or be implemented as a signal, or as a plurality of signals. One or more signals may be included in and/or represented by a message. Signaling, in particular control signaling, may comprise a plurality of signals and/or messages, which may be transmitted on different carriers and/or be associated to different signaling processes, e.g. representing and/or pertaining to one or more such processes and/or corresponding information. An indication may comprise signaling, and/or a plurality of signals and/or messages and/or may be comprised therein, which may be transmitted on different carriers and/or be associated to different acknowledgement signaling processes, e.g. representing and/or pertaining to one or more such processes.

Uplink or sidelink signaling may be OFDMA (Orthogonal Frequency Division Multiple Access) or SC-FDMA (Single Carrier Frequency Division Multiple Access) signaling. Downlink signaling may in particular be OFDMA signaling. However, signaling is not limited thereto (Filter-Bank based signaling may be considered one alternative).

A radio node may generally be considered a device or node adapted for wireless and/or radio (and/or microwave) frequency communication, and/or for communication utilising an air interface, e.g. according to a communication standard.

A radio node may be a network node, or a user equipment or terminal. A network node may be any radio node of a wireless communication network, e.g. a base station and/or gNodeB (gNB) and/or eNodeB (eNB) and/or relay node and/or micro/nano/pico/femto node and/or Remote Radio Head (RRH) and/or other node, in particular for a RAN as described herein.

The terms wireless device, user equipment (UE) and terminal may be considered to be interchangeable in the context of this disclosure. A wireless device, user equipment or terminal may represent an end device for communication utilising the wireless communication network, and/or be implemented as a user equipment according to a standard. Examples of user equipments may comprise a phone like a smartphone, a personal communication device, a mobile phone or terminal, a computer, in particular laptop, a sensor or machine with radio capability (and/or adapted for the air interface), in particular for MTC (Machine-Type-Communication, sometimes also referred to M2M, Machine-To-Machine), or a vehicle adapted for wireless communication. A user equipment or terminal may be mobile or stationary.

A radio node may generally comprise processing circuitry and/or radio circuitry. Circuitry may comprise integrated circuitry. Processing circuitry may comprise one or more processors and/or controllers (e.g., microcontrollers), and/or ASICs (Application Specific Integrated Circuitry) and/or FPGAs (Field Programmable Gate Array), or similar. It may be considered that processing circuitry comprises, and/or is (operatively) connected or connectable to one or more memories or memory arrangements. A memory arrangement may comprise one or more memories. A memory may be adapted to store digital information. Examples for memories comprise volatile and non-volatile memory, and/or Random Access Memory (RAM), and/or Read-Only-Memory (ROM), and/or magnetic and/or optical memory, and/or flash memory, and/or hard disk memory, and/or EPROM or EEPROM (Erasable Programmable ROM or Electrically Erasable Programmable ROM). Radio circuitry may comprise one or more transmitters and/or receivers and/or transceivers (a transceiver may operate or be operable as transmitter and receiver, and/or may comprise joint or separated circuitry for receiving and transmitting, e.g. in one package or housing), and/or may comprise one or more amplifiers and/or oscillators and/or filters, and/or may comprise, and/or be connected or connectable to antenna circuitry and/or one or more antennas.

Any one or all of the modules disclosed herein may be implemented in software and/or firmware and/or hardware. Different modules may be associated to different components of a radio node, e.g. different circuitries or different parts of a circuitry. It may be considered that a module is distributed over different components and/or circuitries. A program product as described herein may comprise the modules related to a device on which the program product is intended (e.g., a user equipment or network node) to be executed (the execution may be performed on the associated circuitry).

A radio access network may be a wireless communication network, and/or a Radio Access Network (RAN) in particular according to a communication standard. A communication standard may in particular a standard according to 3GPP and/or 5G, e.g. according to NR or LTE, in particular LTE Evolution.

A wireless communication network may be and/or comprise a Radio Access Network (RAN), which may be and/or comprise any kind of cellular and/or wireless radio network, which may be connected or connectable to a core network. The approaches described herein are particularly suitable for a 5G network, e.g. LTE Evolution and/or NR (New Radio), respectively successors thereof. A RAN may comprise one or more network nodes. A network node may in particular be a radio node adapted for radio and/or wireless and/or cellular communication with one or more terminals. A terminal may be any device adapted for radio and/or wireless and/or cellular communication with or within a RAN, e.g. a user equipment (UE) or mobile phone or smartphone or computing device or vehicular communication device or device for machine-type-communication (MTC), etc. A terminal may be mobile, or in some cases stationary.

Transmitting in downlink may pertain to transmission from the network or network node to the terminal. Transmitting in uplink may pertain to transmission from the terminal to the network or network node. Transmitting in sidelink may pertain to (direct) transmission from on terminal to another. Uplink, downlink and sidelink (e.g., sidelink transmission and reception) may be considered communication directions.

Signaling may generally comprise one or more signals and/or one or more symbols. Control information or a control information message or corresponding signaling (control signaling) may be transmitted on a control channel, e.g. a physical control channel, which may be a downlink channel or (or a sidelink channel in some cases, e.g. one UE scheduling another UE). For example, control information/allocation information may be signaled by a network node on PDCCH (Physical Downlink Control Channel) and/or a PDSCH (Physical Downlink Shared Channel) and/or a HARQ-specific channel. Acknowledgement signaling, e.g. as a form of uplink control information, may be transmitted by a terminal on a PUCCH (Physical Uplink Control Channel) and/or PUSCH (Physical Uplink Shared Channel) and/or a HARQ-specific channel. Multiple channels may apply for multi-component/multi-carrier indication or signaling.

Transmitting or transmitting signaling, in particular control signaling, e.g. comprising or representing acknowledgement signaling and/or resource requesting information and/or measurement reporting, may comprise encoding and/or modulating. Encoding and/or modulating may comprise error detection coding and/or forward error correction encoding and/or scrambling. Receiving control signaling may comprise corresponding decoding and/or demodulation.

An indication generally may explicitly and/or implicitly indicate the information it represents and/or indicates. Implicit indication may for example be based on position and/or resource used for transmission. Explicit indication may for example be based on a parametrisation with one or more parameters, and/or one or more index or indices, and/or one or more bit patterns representing the information. It may in particular be considered that control signaling as described herein, based on the utilised resource sequence, implicitly indicates the control signaling type.

A resource element may generally describe the smallest individually usable and/or encodable and/or decodable and/or modulatable and/or demodulatable time-frequency resource, and/or may describe a time-frequency resource covering a symbol time length in time and a subcarrier in frequency. A signal may be allocatable and/or allocated to a resource element. A subcarrier may be a subband of a carrier, e.g. as defined by a standard. A carrier may define a frequency and/or frequency band for transmission and/or reception. In some variants, a signal (jointly encoded/modulated) may cover more than one resource elements. A resource element may generally be as defined by a corresponding standard, e.g. NR or LTE. As symbol time length and/or subcarrier spacing (and/or numerology) may be different between different symbols and/or subcarriers, different resource elements may have different extension (length/width) in time and/or frequency domain, in particular resource elements pertaining to different carriers.

A resource generally may represent a time-frequency and/or code resource, on which signaling, e.g. according to a specific format, may be communicated, for example transmitted and/or received, and/or be intended for transmission and/or reception.

A border symbol may generally represent a starting symbol for transmitting or an ending symbol for receiving. A starting symbol may in particular be a starting symbol of uplink or sidelink signaling, for example control signaling or data signaling. Such signaling may be on a data channel or control channel, e.g. a physical channel, in particular a physical uplink shared channel (like PUSCH) or a sidelink data or shared channel, or a physical uplink control channel (like PUCCH) or a sidelink control channel. If the starting symbol is associated to control signaling (e.g., on a control channel), the control signaling may be in response to received signaling (in sidelink or downlink), e.g. representing acknowledgement signaling associated thereto, which may be HARQ or ARQ signaling. An ending symbol may represent an ending symbol (in time) of downlink or sidelink transmission or signaling, which may be intended or scheduled for the radio node or user equipment. Such downlink signaling may in particular be data signaling, e.g. on a physical downlink channel like a shared channel, e.g. a PDSCH (Physical Downlink Shared Channel). A starting symbol may be determined based on, and/or in relation to, such an ending symbol. A border of a symbol may represent in particular a border of a symbol in time, e.g. a starting border or ending border.

Configuring a radio node, in particular a terminal or user equipment, may refer to the radio node being adapted or caused or set to operate according to the configuration. Configuring may be done by another device, e.g., a network node (for example, a radio node of the network like a base station or eNodeB) or network, in which case it may comprise transmitting configuration data to the radio node to be configured.

Such configuration data may represent the configuration to be configured and/or comprise one or more instruction pertaining to a configuration, e.g. a configuration for transmitting and/or receiving on allocated resources, in particular frequency resources. A radio node may configure itself, e.g., based on configuration data received from a network or network node. A network node may utilise, and/or be adapted to utilise, its circuitry/ies for configuring. Allocation information may be considered a form of configuration data.

Generally, configuring may include determining configuration data representing the configuration and providing it to one or more other nodes (parallel and/or sequentially), which may transmit it further to the radio node (or another node, which may be repeated until it reaches the wireless device). Alternatively, or additionally, configuring a radio node, e.g., by a network node or other device, may include receiving configuration data and/or data pertaining to configuration data, e.g., from another node like a network node, which may be a higher-level node of the network, and/or transmitting received configuration data to the radio node. Accordingly, determining a configuration and transmitting the configuration data to the radio node may be performed by different network nodes or entities, which may be able to communicate via a suitable interface, e.g., an X2 interface in the case of LTE or a corresponding interface for NR. Configuring a terminal may comprise scheduling downlink and/or uplink transmissions for the terminal, e.g. downlink data and/or downlink control signaling and/or DCI and/or uplink signaling, in particular acknowledgement signaling, and/or configuring resources and/or a resource pool therefor.

A resource structure may general represent a structure in time and/or frequency domain, in particular representing a time interval and a frequency interval. A resource structure may comprise and/or be comprised of resource elements, and/or the time interval of a resource structure may comprise and/or be comprised of symbol time interval/s, and/or the frequency interval of a resource structure may comprise and/or be comprised of subcarrier/s. A resource element may be considered an example for a resource structure, a slot or mini-slot or a Physical Resource Block (PRB) or parts thereof may be considered others. A resource structure may be associated to a specific channel, e.g. a PUSCH or PUCCH, in particular resource structure smaller than a slot or PRB.

A carrier may generally represent a frequency range or band and/or pertain to a central frequency and an associated frequency interval. It may be considered that a carrier comprises a plurality of subcarriers. A carrier may have assigned to it a central frequency or center frequency interval, e.g. represented by one or more subcarriers (to each subcarrier there may be generally assigned a frequency bandwidth or interval). Different carriers may be non-overlapping, and/or may be neighboring in frequency domain.

It should be noted that the term "radio" in this disclosure may be considered to pertain to wireless communication in general, and may also include wireless communication utilising microwave and/or millimeter and/or other frequencies, in particular between 100 MHz or 1 GHz, and 100 GHz or 20 or 10 GHz. Such communication may utilise one or more carriers.

A radio node, in particular a network node or a terminal, may generally be any device adapted for transmitting and/or receiving radio and/or wireless signals and/or data, in particular communication data, in particular on at least one carrier. The at least one carrier may comprise a carrier accessed based on a LBT procedure (which may be called LBT carrier), e.g., an unlicensed carrier. It may be considered that the carrier is part of a carrier aggregate.

Receiving or transmitting on a cell or carrier may refer to receiving or transmitting utilizing a frequency (band) or spectrum associated to the cell or carrier. A cell may generally comprise and/or be defined by or for one or more carriers, in particular at least one carrier for UL communication/transmission (called UL carrier) and at least one carrier for DL communication/transmission (called DL carrier). It may be considered that a cell comprises different numbers of UL carriers and DL carriers. Alternatively, or additionally, a cell may comprise at least one carrier for UL communication/transmission and DL communication/transmission, e.g., in TDD-based approaches.

A channel may generally be a logical, transport or physical channel. A channel may comprise and/or be arranged on one or more carriers, in particular a plurality of subcarriers. A channel carrying and/or for carrying control signaling/control information may be considered a control channel, in particular if it is a physical layer channel.

In general, a symbol may represent and/or be associated to a symbol time length, which may be dependent on the carrier and/or subcarrier spacing and/or numerology of the associated carrier. Accordingly, a symbol may be considered to indicate a time interval having a symbol time length in relation to frequency domain. A symbol time length may be dependent on a carrier frequency and/or bandwidth and/or numerology and/or subcarrier spacing of or associated to a symbol. Accordingly, different symbols may have different symbol time lengths.

A sidelink may generally represent a communication channel (or channel structure) between two UEs and/or terminals, in which data is transmitted between the participants (UEs and/or terminals) via the communication channel, e.g. directly and/or without being relayed via a network node. A sidelink may be established only and/or directly via air interface/s of the participant, which may be directly linked via the sidelink communication channel. In some variants, sidelink communication may be performed without interaction by a network node, e.g. on fixedly defined resources and/or on resources negotiated between the participants. Alternatively, or additionally, it may be considered that a network node provides some control functionality, e.g. by configuring resources, in particular one or more resource pool/s, for sidelink communication, and/or monitoring a sidelink, e.g. for charging purposes.

Sidelink communication may also be referred to as device-to-device (D2D) communication, and/or in some cases as ProSe (Proximity Services) communication, e.g. in the context of LTE. A sidelink may be implemented in the context of V2x communication (Vehicular communication), e.g. V2V (Vehicle-to-Vehicle), V2I (Vehicle-to-Infrastructure) and/or V2P (Vehicle-to-Person). Any device adapted for sidelink communication may be considered a user equipment or terminal.

A sidelink communication channel (or structure) may comprise one or more (e.g., physical or logical) channels, e.g. a PSCCH (Physical Sidelink Control CHannel, which may for example carry control information like an acknowledgement position indication, and/or a PSSCH (Physical Sidelink Shared CHannel, which for example may carry data and/or acknowledgement signaling). It may be considered that a sidelink communication channel (or structure) pertains to and/or used one or more carrier/s and/or frequency range/s associated to, and/or being used by, cellular communication, e.g. according to a specific license and/or standard. Participants may share a (physical) channel and/or resources, in particular in frequency domain and/or related to a frequency resource like a carrier) of a sidelink, such that two or more participants transmit thereon, e.g. simultaneously, and/or time-shifted, and/or there may be associated specific channels and/or resources to specific participants, so that for example only one participant transmits on a specific channel or on a specific resource or specific resources, e.g., in frequency domain and/or related to one or more carriers or subcarriers.

A sidelink may comply with, and/or be implemented according to, a specific standard, e.g. a LTE-based standard and/or NR. A sidelink may utilise TDD (Time Division Duplex) and/or FDD (Frequency Division Duplex) technology, e.g. as configured by a network node, and/or preconfigured and/or negotiated between the participants. A user equipment may be considered to be adapted for sidelink communication if it, and/or its radio circuitry and/or processing circuitry, is adapted for utilising a sidelink, e.g. on one or more frequency ranges and/or carriers and/or in one or more formats, in particular according to a specific standard. It may be generally considered that a Radio Access Network is defined by two participants of a sidelink communication. Alternatively, or additionally, a Radio Access Network may be represented, and/or defined with, and/or be related to a network node and/or communication with such a node.

Communication or communicating may generally comprise transmitting and/or receiving signaling. Communication on a sidelink (or sidelink signaling) may comprise utilising the sidelink for communication (respectively, for signaling). Sidelink transmission and/or transmitting on a sidelink may be considered to comprise transmission utilising the sidelink, e.g. associated resources and/or transmission formats and/or circuitry and/or the air interface. Sidelink reception and/or receiving on a sidelink may be considered to comprise reception utilising the sidelink, e.g. associated resources and/or transmission formats and/or circuitry and/or the air interface. Sidelink control information (e.g., SCI) may generally be considered to comprise control information transmitted utilising a sidelink.

Generally, carrier aggregation (CA) may refer to the concept of a radio connection and/or communication link between a wireless and/or cellular communication network and/or network node and a terminal or on a sidelink comprising a plurality of carriers for at least one direction of transmission (e.g. DL and/or UL), as well as to the aggregate of carriers. A corresponding communication link may be referred to as carrier aggregated communication link or CA communication link; carriers in a carrier aggregate may be referred to as component carriers (CC). In such a link, data may be transmitted over more than one of the carriers and/or all the carriers of the carrier aggregation (the aggregate of carriers). A carrier aggregation may comprise one (or more) dedicated control carriers and/or primary carriers (which may e.g. be referred to as primary component carrier or PCC), over which control information may be transmitted, wherein the control information may refer to the primary carrier and other carriers, which may be referred to as secondary carriers (or secondary component carrier, SCC). However, in some approaches, control information may be send over more than one carrier of an aggregate, e.g. one or more PCCs and one PCC and one or more SCCs.

A transmission may generally pertain to a specific channel and/or specific resources, in particular with a starting symbol and ending symbol in time, covering the interval therebetween. A scheduled transmission may be a transmission scheduled and/or expected and/or for which resources are scheduled or provided or reserved. However, not every scheduled transmission has to be realized. For example, a scheduled downlink transmission may not be received, or a scheduled uplink transmission may not be transmitted due to power limitations, or other influences (e.g., a channel on an unlicensed carrier being occupied). A transmission may be scheduled for a transmission timing substructure (e.g., a mini-slot, and/or covering only a part of a transmission timing structure) within a transmission timing structure like a slot. A border symbol may be indicative of a symbol in the transmission timing structure at which the transmission starts or ends.

Predefined in the context of this disclosure may refer to the related information being defined for example in a standard, and/or being available without specific configuration from a network or network node, e.g. stored in memory, for example independent of being configured. Configured or configurable may be considered to pertain to the corresponding information being set/configured, e.g. by the network or a network node.

A mini-slot may be transmitted and/or received based on a configuration.

A configuration, like a mini-slot configuration and/or structure configuration, may schedule transmissions, e.g. for the time/transmissions it is valid, and/or transmissions may be scheduled by separate signaling or separate configuration, e.g. separate RRC signaling and/or downlink control information signaling. It should be noted that downlink control information or specifically DCI signaling may be considered physical layer signaling, in contrast to higher layer signaling like MAC (Medium Access Control) signaling or RRC layer signaling. The higher the layer of signaling is, the less frequent/the more time/resource consuming it may be considered, at least partially due to the information contained in such signaling having to be passed on through several layers, each layer requiring processing and handling.

A scheduled transmission and/or mini-slot or beam may pertain to a specific channel, in particular a physical uplink shared channel, a physical uplink control channel, or a physical downlink shared channel, e.g. PUSCH, PUCCH or PDSCH, and/or may pertain to a specific cell and/or carrier aggregation. A corresponding configuration, e.g. scheduling configuration or symbol configuration may pertain to such channel, cell and/or carrier aggregation.

A configuration may be a configuration indicating timing, and/or be represented or configured with corresponding configuration data. A configuration may be embedded in, and/or comprised in, a message or configuration or corresponding data, which may indicate and/or schedule resources, in particular semi-persistently and/or semi-statically. Dynamic signaling or scheduling or configuring may pertain to time scales of the order of one or several transmission timing structures, e.g. one or more slot intervals, and/or may be transmitted on a physical channel and/or with DCI. Semi-static in this context may pertain to longer time scales, and/or transmission utilising higher layer signaling, e.g. RRC signaling (Radio Resource Control signaling).

It may be considered that the scheduled transmission represents transmission on a physical channel, in particular a shared physical channel, for example a physical uplink shared channel or physical downlink shared channel. For such channels, semi-persistent configuring may be particularly suitable.

A control region of a transmission timing structure may be an interval in time for intended or scheduled or reserved for control signaling, in particular downlink control signaling, and/or for a specific control channel, e.g. a physical downlink control channel like PDCCH. The interval may comprise, and/or consist of, a number of symbols in time, which may be configured or configurable, e.g. by (UE-specific) dedicated signaling (which may be single-cast, for example addressed to or intended for a specific UE), e.g. on a PDCCH, or RRC signaling, or on a multicast or broadcast channel. In general, the transmission timing structure may comprise a control region covering a configurable number of symbols. It may be considered that in general the border symbol is configured to be after the control region in time.

The duration of a symbol of the transmission timing structure may generally be dependent on a numerology and/or carrier, wherein the numerology and/or carrier may be configurable. The numerology may be the numerology to be used for the scheduled transmission.

Scheduling a device, or for a device, and/or related transmission or signaling, may be considered comprising, or being a form of, configuring the device with resources, and/or of indicating to the device resources, e.g. to use for communicating. Scheduling a beam may comprise scheduling the beam for one or more receivers, e.g. UEs, which may be in locations covered by the same beam. Scheduling a beam may consider beam switching, and/or a beam may be characterized by a switching pattern, e.g. in time and/or space. Scheduling may in particular pertain to a transmission timing structure, or a substructure thereof (e.g., a slot or a mini-slot, which may be considered a substructure of a slot). It may be considered that a border symbol may be identified and/or determined in relation to the transmission timing structure even if for a substructure being scheduled, e.g. if an underlying timing grid is defined based on the transmission timing structure. Signaling indicating scheduling may comprise corresponding scheduling information and/or be considered to represent or contain configuration data indicating the scheduled transmission and/or comprising scheduling information. Such configuration data or signaling may be considered a resource configuration or scheduling configuration. It should be noted that such a configuration (in particular as single message) in some cases may not be complete without other configuration data, e.g. configured with other signaling, e.g. higher layer signaling. In particular, the symbol configuration may be provided in addition to scheduling/resource configuration to identify exactly which symbols are assigned to a scheduled transmission. A scheduling (or resource) configuration may indicate transmission timing structure/s and/or resource amount (e.g., in number of symbols or length in time) for a scheduled transmission.

A scheduled transmission may be transmission scheduled, e.g. by the network or network node. Transmission may in this context may be uplink (UL) or downlink (DL) or sidelink (SL) transmission. A device, e.g. a user equipment, for which the scheduled transmission is scheduled, may accordingly be scheduled to receive (e.g., in DL or SL), or to transmit (e.g., in UL or SL) the scheduled transmission. Scheduling transmission may in particular be considered to comprise configuring a scheduled device with resource/s for this transmission, and/or informing the device that the transmission is intended and/or scheduled for some resources. A transmission may be scheduled to cover a time interval, in particular a successive number of symbols, which may form a continuous interval in time between (and including) a starting symbol and an ending symbols. The starting symbol and the ending symbol of a (e.g., scheduled) transmission may be within the same transmission timing structure, e.g. the same slot. However, in some cases, the ending symbol may be in a later transmission timing structure than the starting symbol, in particular a structure following in time. To a scheduled transmission, a duration may be associated and/or indicated, e.g. in a number of symbols or associated time intervals. In some variants, there may be different transmissions scheduled in the same transmission timing structure. A scheduled transmission may be considered to be associated to a specific channel, e.g. a shared channel like PUSCH or PDSCH.

A transmission timing structure may comprise a plurality of symbols, and/or define an interval comprising several symbols (respectively their associated time intervals). In the context of this disclosure, it should be noted that a reference to a symbol for ease of reference may be interpreted to refer to the time domain projection or time interval or time component or duration or length in time of the symbol, unless it is clear from the context that the frequency domain component also has to be considered. Examples of transmission timing structures include slot, subframe, mini-slot (which also may be considered a substructure of a slot), slot aggregation (which may comprise a plurality of slots and may be considered a superstructure of a slot), respectively their time domain component.

A transmission timing structure may generally comprise a plurality of symbols defining the time domain extension (e.g., interval or length or duration) of the transmission timing structure, and arranged neighboring to each other in a numbered sequence. A timing structure (which may also be considered or implemented as synchronisation structure) may be defined by a succession of such transmission timing structures, which may for example define a timing grid with symbols representing the smallest grid structures. A transmission timing structure, and/or a border symbol or a scheduled transmission may be determined or scheduled in relation to such a timing grid. A transmission timing structure of reception may be the transmission timing structure in which the scheduling control signaling is received, e.g. in relation to the timing grid. A transmission timing structure may in particular be a slot or subframe or in some cases, a mini-slot.

In this disclosure, for purposes of explanation and not limitation, specific details are set forth (such as particular network functions, processes and signaling steps) in order to provide a thorough understanding of the technique presented herein. It will be apparent to one skilled in the art that the present concepts and aspects may be practiced in other variants and variants that depart from these specific details.

For example, the concepts and variants are partially described in the context of Long Term Evolution (LTE) or LTE-Advanced (LTE-A) or New Radio mobile or wireless communications technologies; however, this does not rule out the use of the present concepts and aspects in connection with additional or alternative mobile communication technologies such as the Global System for Mobile Communications (GSM). While the following variants will partially be described with respect to certain Technical Specifications (TSs) of the Third Generation Partnership Project (3GPP), it will be appreciated that the present concepts and aspects could also be realized in connection with different Performance Management (PM) specifications.

Moreover, those skilled in the art will appreciate that the services, functions and steps explained herein may be implemented using software functioning in conjunction with a programmed microprocessor, or using an Application Specific Integrated Circuit (ASIC), a Digital Signal Processor (DSP), a Field Programmable Gate Array (FPGA) or general purpose computer. It will also be appreciated that while the variants described herein are elucidated in the context of methods and devices, the concepts and aspects presented herein may also be embodied in a program product as well as in a system comprising control circuitry, e.g. a computer processor and a memory coupled to the processor, wherein the memory is encoded with one or more programs or program products that execute the services, functions and steps disclosed herein.

It is believed that the advantages of the aspects and variants presented herein will be fully understood from the foregoing description, and it will be apparent that various changes may be made in the form, constructions and arrangement of the exemplary aspects thereof without departing from the scope of the concepts and aspects described herein or without sacrificing all of its advantageous effects. The aspects presented herein can be varied in many ways.

Alternatively, or additionally to the above, there may be considered the following in particular as contribution for NR:

Background related to Signal Quality Measurement for Mobility is discussed in the following.

The agreed NR mobility related measurements (SS RSRP and CSI-RSRP) are signal strength measurements. But RAN1 has not agreed any signal quality measurement for mobility in NR.

In LTE, RSRQ which is a signal quality measurement was introduced in Rel-8 for mobility in RRC connected state and in Rel-9 for mobility in RRC idle state. The RSRQ definition has also been evolved over time. For example, in later releases (e.g. in Rel-11) the RSRQ was modified to measure RSSI measurement over all symbols of the subframe to better adapt for some features such as (eICIC, FeICIC, LAA).

In LTE, RSRQ is not suitable for all scenarios and system load. For example, RSRQ is less reliable at higher Es/Iot since RSSI also includes contributions from the serving cell.

Therefore, in LTE another signal quality RS-SINR, which is SINR measured on the CRS, was introduced in Rel-13. It only applies to RRC connected state. RS-SINR can better represent data RE signal quality in synchronized network with non-colliding CRS (i.e. when CRS collides with data RE of other cells). But RS-SINR has slightly worse accuracy than that of RSRQ at higher Es/Iot i.e. ≥−3 dB.

An important use case for signal quality measurements is to trigger a measurement procedure on a target carrier when interference on the serving carrier exceeds certain threshold. Otherwise, the reception quality of the serving cell will be degraded and also handover to another cell on the serving carrier will not improve the reception quality. As signal strength measurement cannot detect the interference component, therefore in such situation signal strength alone is insufficient for appropriate mobility decision. More specifically, the signal quality measurement is used for the following mobility scenarios in LTE:
  Triggering of measurements on non-serving carrier in idle state e.g. when serving cell RSRQ falls below threshold,
  Triggering of inter-frequency and/or inter-RAT measurements in RRC connected state e.g. triggering of measurements gaps,
  Inter-frequency mobility e.g. handover between cells of serving and non-serving carriers.
  Mobility between serving carriers in CA e.g. swapping between PCell and SCell.

Challenges of Signal Quality Measurement in NR are described in the following.

NR will also support mobility scenarios and use cases which are similar to those exist in LTE. Some sort of quality based measurement metric may also be required in NR.

In NR, the signal quality can be measured on SS transmitted in a SS burst, which contains multiple SS blocks. The SS burst is carrier specific information provided to the UE. Therefore, to enable signal quality measurement based on a SS burst, the network has to provide carrier specific information to the UE.

Under the assumption that the signal quality in NR is measured on SS signals, the equivalent of LTE RSRQ and LTE RS-SINR in NR would be synchronization signal received quality (SSRQ) and synchronization signal SINR (SS-SINR), respectively. One task of signal quality measurement (as its name imply) is its ability to reflect the cell quality, or in other words interference in the cell. The interference caused by common physical signals (e.g. PSS, NSS, etc.) and common channels (e.g. PBCH, SIBs) are practically static. However, interference caused by control channel (e.g. PDCCH) and in particular data channel (e.g. PDCCH) varies as function of load in the cell (e.g. number of scheduled UEs and/or data rate per UE). Therefore, in order to reflect true cell quality, the interference component of the signal quality measurement should incorporate at least some of the interference caused by the resource elements which carry data channel.

In NR, the SS blocks belonging to different cells operating on the same carrier frequency are likely to be at least partly time aligned or time synchronized. Furthermore, NR-PSS and NR-SSS subcarriers (127 SCs) are contiguous in frequency domain. This means that typically NR-SSS, which will be used for RSRP, will collide across cells on the same carrier. On the other hand, in LTE, the symbols containing CRS, which are used for RSRQ, are neither contiguous in time nor the CRS subcarriers are contiguous in frequency domain. The subcarriers between CRS subcarriers can carry data and also control channels (in 1-4 symbols depending on BW). Therefore, in LTE RSRQ measurement, the RSSI part measured in the CRS symbols, reflect cell quality.

A Signal Quality Measurement Definition in NR is proposed.

The SS block structure is not yet fully finalized by RAN1. But according to the latest RAN1 agreements in RAN1 #89 (May 2017 meeting), all the SS blocks within the SS burst set shall be transmitted within a 5 ms window. The number of SS blocks (L) within the SS burst set depends on the frequency range. Another important agreement is that the first 1-4 symbols (depending on SS subcarrier spacing) in a slot will contain DL control channels (representing a control region). This means SS blocks within the SS burst set will be separated by symbols containing at least DL control channels. For example, assuming L=4, the SS structure in an SS burst set will look like as shown in FIG. 2.

Agreements to be considered comprise:
  The transmission of SS blocks within SS burst set is confined to a 5 ms window regardless of SS burst set periodicity;
  Within this 5 ms window, the number of possible candidate SS block locations is L;
  The maximum number of SS-blocks within SS burst set, L, for different frequency ranges are
  For frequency range up to 3 GHz, L is 4
  For frequency range from 3 GHz to 6 GHz, L is 8
  For frequency range from 6 GHz to 52.6 GHz, L is 64
  Note that RAN1 assumes minimum number of SS blocks transmitted within each SS burst set is one to define performance requirements
  More agreements pertain to:
  For the possible SS block time locations, the following mapping is followed:
  In the mapping with 15 and 30 kHz subcarrier spacing, the following requirements are met
  At least [1 or 2] symbols are preserved for DL control at the beginning of the slot of 14 symbols
  At least 2 symbols are preserved for e.g. guard period and UL control at the end of the slot of 14 symbols
  Note: slot is defined based on SS subcarrier spacing
  At most two possible SS block time locations are mapped to one slot of 14 symbols
  In the mapping with 120 kHz subcarrier spacing, the following requirements are met
  At least 2 symbol are preserved for DL control at the beginning of the slot of 14 symbols
  At least 2 symbols are preserved for e.g. guard period and UL control at the end of the slot of 14 symbols
  Note: slot is defined based on SS subcarrier spacing
  At most two possible SS block time locations are mapped to one slot of 14 symbols
  In the mapping with 240 kHz subcarrier spacing across two consecutive slots, the following requirements are met
  At least 4 symbol are preserved for DL control at the beginning of the first slot of 14 symbols
  At least 4 symbols are preserved for e.g. guard period and UL control at the end of the second slot of 14 symbols
  Note: slot is defined by 240 kHz subcarrier spacing
  At most four possible SS block time locations are mapped to two consecutive slots of 14 symbols each A SS block does not cross the middle of the slot of 14 symbols defined by 15 kHz sub-carrier spacing Mapping of SS block time locations for NR unlicensed band operation is FFS Above agreements do not preclude 7 OFDM symbol slot operation One possibility is to specify SSRQ or SS-SINR. Another option is that both SSRQ and SS-SINR are specified in NR. Yet another option is to define an entirely new kind of signal quality measurement which is best suited for NR mobility uses cases.

Firstly it is proposed that the RSRQ based signal quality measurement is defined in NR as SSRQ. This is because the alternative measurement, SS-SINR, due to collision of SSS among cells on the same carrier, will reflect the worst case signal quality in the cell, e.g. when the cell is fully loaded.

In SSRQ, the RSRP part shall be measured on SSS transmitted in any one or more SS blocks. However, to ensure that RSSI incorporates sufficient contributions from resource elements which can carry data channel, it is proposed that RSSI is measured over time duration ($T_{RSSI}$) starting from the first symbol containing the first SS block in the SS burst set as follows:

$T_{RSSI} = \text{Max}(5\text{ ms}, 2*M*L*T_{SS\text{-}symbol})$ wherein:
M is the number of number of symbols in the SS blocks. This is likely to be a fixed number defined in RAN1 specification.
L is the maximum number of SS blocks within the SS burst set. L depends on carrier frequency of the cell.
$T_{SS\text{-}symbol}$ is the duration of the symbol in the SS block. This depends on subcarrier spacing of SS block.
A factor of 2 is assumed to ensure that the RSSI is measured over at least certain number of data symbols.

Assuming M=4, $T_{RSSI}=8*L*T_{SS\text{-}symbol}$. Examples of for different combination of parameters related to the SS block for maximum value of L are shown in table 1. The table shows that the maximum duration shall be much less than 5 ms, even when the value of L is maximum. In case the configured value of L is shorter than the maximum value then the $T_{RSSI}$ will even be smaller.

TABLE 1

Summary of parameters for deriving duration of RSSI measurement

| Frequency range (F) (GHz) | Number of SS block per SS burst set (L) | Number of SS block per SS burst set (L) | SS symbol duration including CP (μs) | RSSI measurement duration ($T_{RSSI}$) (ms) |
| --- | --- | --- | --- | --- |
| F ≤ 3 | 15 | 4 | 71.43 | 0.22 |
| F ≤ 3 | 30 | 4 | 35.71 | 0.11 |
| 3 < F ≤ 6 | 30 | 8 | 35.71 | 0.22 |
| 6 < F ≤ 52.6 | 120 | 64 | 8.93 | 0.46 |
| 6 < F ≤ 52.6 | 240 | 64 | 4.465 | 0.11 |

Note:
Number of symbols within SS block = 4 is assumed.

Based on the above analysis the proposed definition of SSRQ is shown in table 2. The term SSRQ used herein may interchangeably referred to NR-SSRQ, NR-RSRQ, RSRQ, etc.

TABLE 2

Proposed SSRQ definition

| | |
| --- | --- |
| Definition | Synchronization Signal Received Quality (SSRQ) is defined as the ratio N × SSRP/(NR carrier RSSI), where N is the number of RB's of the NR carrier RSSI measurement bandwidth. The measurements in the numerator and denominator shall be made over the same set of resource blocks.<br>NR Carrier Received Signal Strength Indicator (NR-RSSI), comprises the linear average of the total received power (in [W]) observed over time duration $T_{RSSI}$ starting from the first symbol containing the first SS block in the SS burst set of the measurement slot, in the measurement bandwidth, over N number of resource blocks by the UE from all sources, including co-channel serving and non-serving cells, adjacent channel interference, thermal noise etc. The time duration, $T_{RSSI}$, is defined as follows:<br>$T_{RSSI} = \text{MAX}(5\text{ ms}, 2*M*L*T_{SS\text{-}symbol})$<br>Where:<br>M is the number of symbols in the SS block,<br>L is the number of SS blocks in the SS burst set and<br>$T_{SS\text{-}symbol}$ is the duration of each symbol in the SS block<br>Higher layers indicate which OFDM symbols the NR-RSRQ is to be measured on. The reference point for the SSRQ shall be the union of all the antenna elements of the UE from which signals are combined by the UE.<br>If there are multiple possible sets of antenna elements whose signals the UE may combine, the reported value shall not be lower than the corresponding SSRQ of any of the individual sets. |

TABLE 2-continued

Proposed SSRQ definition

| | |
|---|---|
| Applicable for | RRC_IDLE intra-frequency, RRC_IDLE inter-frequency, RRC_INACTIVE intra-frequency, RRC_INACTIVE inter-frequency, RRC_CONNECTED intra-frequency, RRC_CONNECTED inter-frequency |

NOTE 1:
The union of the antenna elements that is used as the reference for the SSRQ may be interpreted as the antenna connector for a UE that supports testing by applying known power levels at the antenna connector.

The SSRP used in table 2 is described in table 3. The term SSRP used herein may interchangeably be called as NR-SSRP, NR-RSRP, RSRP etc.

TABLE 3

SSRP definition
Synchronization Signal Received Power (SSRP)

| | |
|---|---|
| Definition | Synchronization signal received power (RSRP) of a reference signal transmitted on a set of ports, is defined as the linear average over the power contributions (in [W]) of the resource elements that carry that reference signals transmitted on that set of ports within the considered measurement frequency bandwidth.<br>For SSRP, the reference signals used for the measurement are indicated by higher layers.<br>The reference for the SSRP shall be the union of all the antenna elements of the UE from which signals are combined by the UE.<br>If there are multiple possible sets of antenna elements whose signals the UE may combine, the reported value shall not belower than the corresponding SSRP of any of the individual sets. |
| Applicable for | RRC_IDLE intra-frequency, RRC_IDLE inter-frequency, RRC_INACTIVE intra-frequency, RRC_INACTIVE inter-frequency, RRC_CONNECTED intra-frequency, RRC_CONNECTED inter-frequency |

NOTE 1:
The number of resource elements within the considered measurement frequency bandwidth and within the measurement period that are used by the UE to determine SSRP is left up to the UE implementation with the limitation that corresponding measurement accuracy requirements have to be fulfilled.
NOTE 2:
The ports correspond e.g. to a given SS block or CSI-RS resource.
NOTE 3:
The union of the antenna elements that is used as the reference for the SSRP may be interpreted as the antenna connector for a UE that supports testing by applying known power levels at the antenna connector.
NOTE 4:
The power per resource element is determined from the energy received during the useful part of the symbol, excluding the CP.

Until now, RAN1 has only agreed to introduce signal strength measurements (SS based RSRP and CSI-RS based CSI-RSRP) for mobility in NR. The need for specifying signal quality measurement similar to RSRQ for mobility in NR is analysed. Also, analysis and proposed definition of SSRQ in NR are provided. There is proposed:

Proposal #1: Signal quality measurement (SSRQ) for mobility in NR which is similar to LTE RSRQ is defined in NR.

Proposal #2: The measurement duration of RSSI part of the NR SSRQ includes at least certain number of symbols containing data channel to reflect cell quality.

Some useful abbreviations comprise:
CSI-RS Channel State Information Reference Signaling
LTE Long Term Evolution, a telecommunication standard
NR New Radio, a telecommunication standard
SSI Signal Strength Indicator/Information
RSSI Received Signal Strength Indicator/Information
RSRP Reference Signal(ing) Received Power
RSRQ Reference Signal(ing) Received Quality
SINR Signal-to-Interference-and-Noise Ratio
SIR Signal-to-Interference Ratio
SNR Signal-to-Noise Ratio
CQI Channel Quality Information
DCI Downlink Control Information
OFDM Orthogonal Frequency Division Multiplex
RRC Radio Resource Control
UCI Uplink Control Information
UE User Equipment
UL Uplink
SL Sidelink
DL Downlink
TX Transmitter, transmission-related
RX Receiver, reception-related
RTT Round-trip time
TOA Time of Arrival
RSTD Reference Signal Time Difference These abbreviations may be interpreted according to 3GPP ($3^{rd}$ Generation Partnership Project, a standardisation organisation).

The invention claimed is:
1. A method of operating a user equipment in a radio access network, the method comprising:

transmitting measurement reporting, the measurement reporting pertaining to a measurement time interval, the measurement time interval being determined based on a Synchronization Signaling, SS, block configuration; and the measurement time interval covering transmission not included in an SS block.

2. The method according to claim 1, wherein the measurement time interval at least one of comprises and overlaps with at least one SS block in time.

3. The method according to claim 1, wherein the measurement time interval at least one of comprises and overlaps with a time interval between two SS blocks.

4. The method according to claim 1, wherein measurement reporting is based on measurements performing during the measurement time interval, and configured by the measurement configuration.

5. The method according to claim 1, wherein the SS block configuration configures synchronisation signaling.

6. A computer storage medium storing a computer program comprising instructions that, when executed, causes processing circuitry to at least one of control and perform a method of operating a user equipment in a radio access network, the method comprising:

transmitting measurement reporting, the measurement reporting pertaining to a measurement time interval, the measurement time interval being determined based on a Synchronization Signaling, SS, block configuration; and the measurement time interval covering transmission not included in an SS block.

7. A user equipment for a radio access network, the user equipment being configured to:

transmit measurement reporting, the measurement reporting pertaining to a measurement time interval, the measurement time interval being determined based on a Synchronization Signaling, SS, block configuration; and the measurement time interval covering transmission not included in an SS block.

8. The user equipment according to claim 7, wherein the measurement time interval at least one of comprises and overlaps with at least one SS block in time.

9. The user equipment according to claim 7, wherein the measurement time interval at least one of comprises and overlaps with a time interval between two SS blocks.

10. The user equipment according to claim 7, wherein measurement reporting is based on measurements performing during the measurement time interval, and configured by the measurement configuration.

11. The user equipment according to claim 7, wherein the SS block configuration configures synchronisation signaling.

12. A method of operating a radio node in a radio access network, the method comprising:

configuring a user equipment with a measurement configuration, the measurement configuration indicating a measurement time interval, the measurement time interval being determined based on a SS Synchronization Signaling, SS, block configuration; and the measurement time interval covering transmission not included in an SS block.

13. The method according to claim 12, wherein the measurement time interval at least one of comprises and overlaps with at least one SS block in time.

14. The method according to claim 12, wherein the measurement time interval at least one of comprises and overlaps with a time interval between two SS blocks.

15. The method according to claim 12, wherein measurement reporting is based on measurements performing during the measurement time interval, and configured by the measurement configuration.

16. The method according to claim 12, wherein the SS block configuration configures synchronisation signaling.

17. A radio node in a radio access network, the radio node being configured to:

configure a user equipment with a measurement configuration, the measurement configuration indicating a measurement time interval, the measurement time interval being determined based on a Synchronization Signaling, SS, block configuration; and the measurement time interval covering transmission not included in an SS block.

* * * * *